Figure 1:
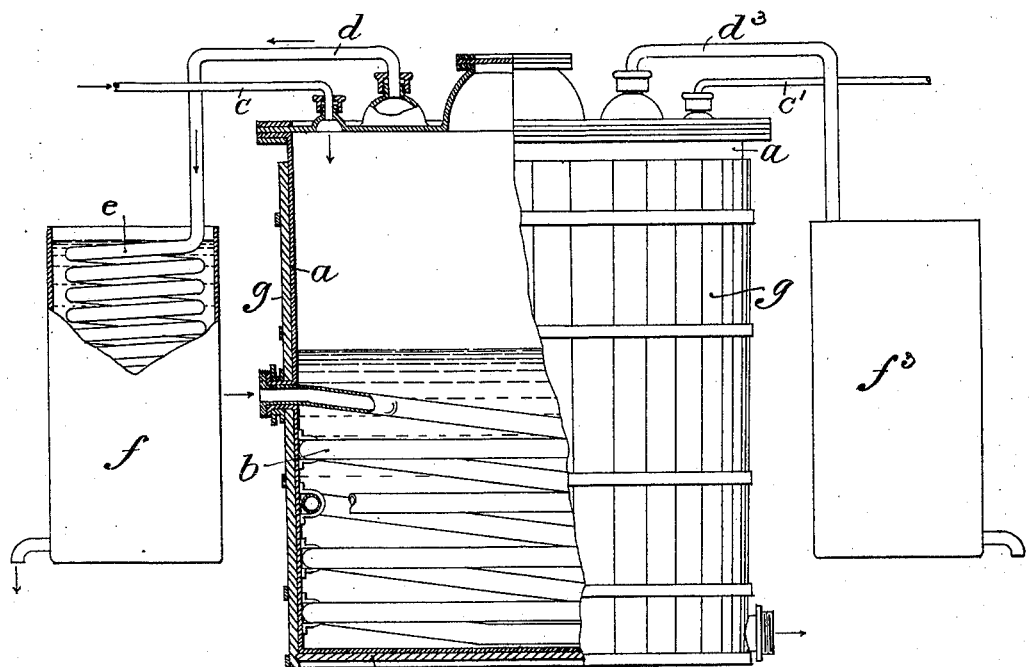

No. 687,994. Patented Dec. 3, 1901.
E. DE HAËN.
PROCESS OF PRODUCING CHEMICALLY PURE HYDROCHLORIC ACID.
(Application filed Aug. 2, 1900.)
(No Model.)

Witnesses:
Joseph H. Niles.
Harry S. Fox.

Inventor:
E. de Haën
by Goeail & Raegener
his Attorneys

UNITED STATES PATENT OFFICE.

EUGEN DE HAËN, OF LIST, NEAR HANOVER, GERMANY.

PROCESS OF PRODUCING CHEMICALLY-PURE HYDROCHLORIC ACID.

SPECIFICATION forming part of Letters Patent No. 687,994, dated December 3, 1901.

Application filed August 2, 1900. Serial No. 25,646. (No specimens.)

*To all whom it may concern:*

Be it known that I, EUGEN DE HAËN, a citizen of the Empire of Germany, residing in List, near Hannover, Germany, have invented certain new and useful Improvements in Processes of Producing Chemically-Pure Hydrochloric Acid, of which the following is a specification.

The manufacture of chemically-pure hydrochloric acid, and specially such which is free of any traces of sulfuric acid and iron, was heretofore accomplished either by the decomposition of pure ordinary cooking salt by means of pure sulfuric acid or by the distillation of the crude hydrochloric acid in glass vessels or, lastly, especially when greater quantities were to be treated, by the distilling off of the vapors of hydrochloric acid after the same have been freed from arsenic by means of concentrated sulfuric acid. These processes were all attended by essential objections—first, for the reason that the use of pure primary substances is too expensive; secondly, that the use of glass vessels, owing to their frangibility, is not well adapted for carrying on the process on a large scale, and lastly, that the process which is most used in practice—namely, the distillation of the hydrochloric-acid vapors from crude hydrochloric acid by concentrated sulfuric acid—is not only objectionable because it has to be carried out in very sensitive clay vessels, but also that in the same large quantities of sulfuric acid are continuously diluted and have to be concentrated again. It appears from the foregoing that the price of pure hydrochloric acid was necessarily always considerably higher than the ordinary acid used in the arts, so that the former could only find a very limited application, while at a lower cost the pure acid could be applied for many different purposes in the arts.

I have succeeded in devising a process for refining hydrochloric acid by which not only a less expensive plant, but also a less expensive treatment of the crude acid, is used and by which the purification of the acid after the same has been freed of arsenic by any known method can be carried out at a very much reduced price as compared to the processes heretofore in use. The process can be used for producing hydrochloric acid of any desired and even the highest degree of concentration, and for this purpose the process consists in continuously mixing crude hydrochloric acid after it has been freed from arsenic with boiling diluted sulfuric acid whose degree of dilution is such that its boiling-point is only about ten degrees above that of the crude hydrochloric acid and then condensing the vapors distilled off, whereby pure hydrochloric acid of the same strength as the crude acid is obtained.

My improved process may be carried out to advantage in the apparatus shown in the accompanying drawings, in which—

Figure 2:
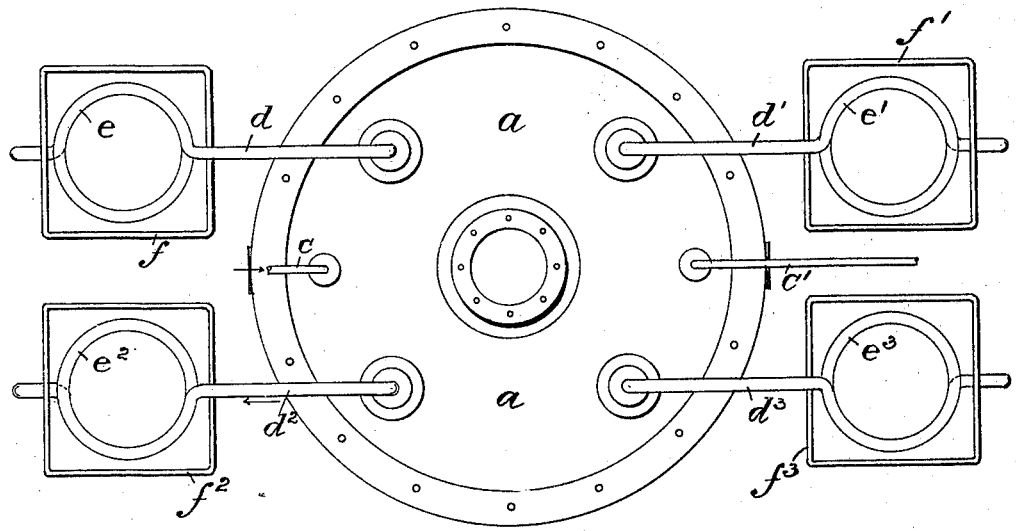

Figure 1 is a side view with parts broken away, and Fig. 2 a top view.

Similar letters of reference indicate corresponding parts in both figures.

In the drawings, $g$ indicates a distilling vessel, which is provided with a lining $a$ of lead, and in which is located a coil $b$, also preferably of lead, through which passes, in the direction indicated by the arrows, steam at a pressure preferably of about three atmospheres from any suitable source. The vessel is partially filled with sulfuric acid, as shown, and is tightly closed at the top by a suitable cover. The sulfuric acid supplied to the vessel $g$ has a boiling-point about 10° centigrade higher than the boiling-point of the hydrochloric acid to be purified. This temperature will of course vary according to the strength of the crude hydrochloric acid; but the boiling-points of both acids can be determined by testing the same before subjection to the process. The sulfuric acid in the vessel $g$ is heated up to its boiling-point, and the crude hydrochloric acid runs into the same through pipes $c\ c'$ in the cover of the vessel. Vapors of hydrochloric acid rise from the boiling contents of the vessel and pass through the pipes $d\ d'\ d^2\ d^3$ into condensing-coils $e\ e'\ e^2\ e^3$, respectively, which are located in suitable condensing vessels $f\ f'\ f^2\ f^3$. In the coils the vapors are condensed into pure hydrochloric acid which is of the same degree of concentration as the crude hydrochloric acid supplied through the pipes $c\ c'$, no change in the same having been effected other than the removal of its impurities, which are left in the sulfuric acid in the distilling vessel. The sulfuric acid does not pass over with the vapors of hydrochloric acid, but remains of the same concentration and can be used in carrying on the process for a long time.

By my improved process pure hydrochloric acid is produced from the crude acid in a rapid and very economical manner. A leaden distilling vessel containing about half a cubic meter, with two inlet-pipes for the crude acid and four condensing-coils for the vapors, is capable of supplying about two thousand kilograms of chemically-pure acid in twenty-four hours. The leaden vessel possesses great durability, as the surface of the same becomes covered with a protective coat of chlorid. The condensing-coils are preferably made of clay, and the expense of the entire plant is very small.

Having thus described my invention, what I claim as new, and desire to secure by Letters Patent, is—

The herein-described process of purifying non-arsenious hydrochloric acid, which consists in boiling a sulfuric acid having a boiling-point approximately 10° higher than that of the acid to be treated, running the crude hydrochloric acid into said boiling sulfuric acid, and condensing the vapors arising therefrom, substantially as set forth.

In testimony that I claim the foregoing as my invention I have signed my name in presence of two subscribing witnesses.

EUGEN DE HAËN.

Witnesses:
LEONORE RASCH,
F. A. BRYCE.